United States Patent [19]

Nicholson

[11] 4,390,663

[45] Jun. 28, 1983

[54] SEMI-CONTINUOUS PROCESS FOR MAKING STAR-BLOCK COPOLYMERS

[75] Inventor: Harold L. Nicholson, West Chester, Pa.

[73] Assignee: Atlantic Richfield Company, Los Angeles, Calif.

[21] Appl. No.: 351,840

[22] Filed: Feb. 24, 1982

Related U.S. Application Data

[63] Continuation-in-part of Ser. No. 235,244, Feb. 17, 1981, abandoned.

[51] Int. Cl.³ .......................................... C08F 297/04
[52] U.S. Cl. ...................................... 525/53; 525/314
[58] Field of Search ................................ 525/53, 314

[56] References Cited

U.S. PATENT DOCUMENTS 4,086,298 4/1978 Fahrbach ............................ 525/314
4,180,530 12/1979 Bi ........................................ 525/314

*Primary Examiner*—Paul R. Michl
*Attorney, Agent, or Firm*—Louis J. Young

[57] ABSTRACT

A semi-continuous process for the preparation of star-block copolymers of 60 to 90% by weight of monovinyl aromatic compound and 10 to 40% by weight of conjugated diene monomer has been developed. The process reduces the time needed to produce the copolymer by shortening reaction time and eliminating the need for costly cleanout between runs. Novel star-block copolymers are prepared which have bimodal arm structures containing a series of tapered copolymer segments.

6 Claims, No Drawings ated Ser. No. 235,244, filed Feb. 17, 1981, now abandoned.

SEMI-CONTINUOUS PROCESS FOR MAKING STAR-BLOCK COPOLYMERS

CROSS-REFERENCE TO RELATED APPLICATION

This application is a continuation-in-part of application Ser. No. 235,244, filed Feb. 17, 1981, now abandoned.

BACKGROUND OF THE INVENTION

The present invention relates to a semi-continuous process for making resinous star-block copolymers.

Highly branch block copolymers, sometimes called star-blocked copolymers, are old in the art of anionic polymerization. These star-block copolymers are prepared by first forming linear block polymers having active lithium atom on one end of the polymer chain. These active, linear polymer chains are then coupled by the addition of a polyfunctional compound having at least three reactive sites capable of reacting with the carbon to lithium bond on the polymer chains to add the polymer chain onto the functional groups of the compound.

Zelinski, U.S. Pat. No. 3,280,084, polymerized butadiene with butyllithium initiator to form B-Li blocks (where B is polybutadiene) which when coupled with 0.02 to 1 part by weight per 100 parts of monomers of divinylbenzene gave starblock copolymers having polydivinylbenzene nuclei and several identical arms of polybutadiene branching therefrom. The arms can also be either random or block copolymers of styrene and butadiene (from A-B-Li blocks, where A is polystyrene segment) where the diene is the major component.

Zelinski, U.S. Pat. No. 3,281,383, teaches similar star-block copolymers to those in U.S. Pat. No. 3,280,084, except that coupling agents such as polyepoxy compounds, polyacids, polyaldehydes, etc., are used.

Childers, U.S. Pat. No. 3,637,554, prepares rubbery starblock copolymers having nuclei formed from polyepoxides, polyisocyanates, polyimines, etc., and identical arms from B-Li and A-B-Li.

Kitchen et al, U.S. Pat. No. 3,639,517, teaches that star-block copolymer may be formed having different molecular weight arms attached to the same nucleus. These arms are formed by using multiple additions of styrene monomer and initiator to form A-Li; A'-Li; and A"-Li, where A, A' and A" are polystyrene blocks of different molecular weights, then by a single addition of butadiene, and finally coupling these arms to form star-block copolymers having bi-, tri and polymodal molecular weight distribution in the arms.

Fetters et al, U.S. Pat. No. 3,985,830, discloses a product having a nucleus of more than one molecule of m-divinyl-benzene and at least three polymeric arms, each being a block copolymer of conjugated diene and monovinyl aromatic monomers wherein said conjugated diene block is linked to said nucleus.

Fahrback et al, U.S. Pat. No. 4,086,298, discloses star-block copolymers having a mixture of arms wherein some are formed by first polymerizing styrene with alkyllithium to form A-Li blocks, and then adding a mixture of styrene and butadiene to form a graded copolymer represented by A-B→A', where the arrow represents a graded segment. Other arms are made up on only the butadiene-styrene graded copolymer segment.

Bi et al., U.S. Pat. No. 4,221,884, discloses star-block copolymers having bimodal distribution of molecular structure in the arms of the copolymer wherein the elastomeric segments comprise a random block followed by a polydiene block next to the star nucleus.

The above patents all suffer from the disadvantage of being lengthy batch processes which require cleaning out of the batch reactor after each run.

SUMMARY OF THE INVENTION

We have now found that the length of each run needed to prepare the star-block copolymers can be shortened considerably and the need to clean out the reactor eliminated by going to a semi-continuous process.

The process involves four separate reactors arranged such that rapid transfer of the contents of each reactor to another reactor is possible. Each reactor is used only for a specific portion of the polymerization and hence does not need cleaning out between consecutive runs. A unique bimodal copolymer is also formed under the process when followed as described.

DETAILED DESCRIPTION OF THE INVENTION

The copolymers prepared by the instant semicontinuous process contain 60 to 90 percent by weight of a monovinyl aromatic compound and 40 to 10 percent by weight of a conjugated diene having 4 to 8 carbon atoms. The copolymers have the general formula

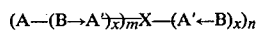

$$(A\!-\!(B\!\rightarrow\!A')_{\overline{x}})_{\overline{m}}X\!-\!(A'\!\leftarrow\!B)_x)_n$$

where A is a non-elastomeric polymer segment based on 80 to 95 percent by weight of the total monovinyl aromatic compound, (B→A') or (A'←B) is an elastomeric copolymer segment based on a tapered copolymer of the remaining 5 to 20 percent by weight of the monovinyl aromatic compound (A') and all of the conjugated diene (B), x is an integer of from 3 to 10 and is the number of additions of conjugated diene in the second reactor, m and n are integers whose sum is between 3 and 20 and X is the radical of a polyfunctional coupling agent forming the nucleus of the star-block copolymer.

The semi-continuous process involves four separate reactors arranged such that the contents of each reactor can be rapidly transferred into the next reactor.

In the first reactor, 80 to 95 percent by weight of the total amount of monovinyl aromatic compound is polymerized in an inert solvent using a hydrocarbyllithium initiator to form linear segments (A-Li), of the monovinyl aromatic compound having lithium ions at the ends. The polymerization is allowed to proceed to essential completion.

To prevent a temperature runaway in this reactor, it is preferred that the monovinyl aromatic compound be added in three equal portions over a period of from 6 to 15 minutes, i.e. with 2-5 minute intervals between additions. The addition of all of the monomer in a single batch might lead to an exothermic polymerization which would be difficult to control by ordinary cooling equipment.

In the second reactor, an additional amount of the hydrocarbyllithium initiator, equal to or greater than the amount added in the first stage, is added to the mixture from stage one, the remainder of the monovinyl aromatic compound is added, and the total amount of the conjugated diene is added in at least 3 equal portions, such that a series of tapered copolymer segments, $(B{\rightarrow}A')_{\overline{x}}Li$ is formed, where x is the number of separate diene additions made. Simultaneously with the formation of the segments, the A-Li segments from stage two will form $A{-}(B{\rightarrow}A')_{\overline{x}}Li$ segments.

In order to ensure that tapered segments are formed, one adds the first portion of diene just prior to, or with, the addition of the remaining monovinyl aromatic compound. Because of the different reactivities of the diene anion and the monovinyl aromatic anion, the diene polymerization predominates and the solution will have the pale-yellow color characteristics of the diene anion. As the diene is used up, the monovinyl aromatic-monomer begins to enter the reaction and when all the diene is used up, the color of the solution changes, rather abruptly, to the reddish-brown color characteristic of the monovinyl aromatic anion. If a second portion of diene is added at this point, the diene polymerization again predominates and a second tapered segment (tapered from polydiene to polymonovinyl aromatic compound) is formed. Thus, if the diene portions are added each time as soon as the monovinyl anion color appears, as many tapered segments can be formed as portions of diene added. After the final diene portion has been added, and the final color of monovinyl aromatic anion reappears, the solution is allowed to react an additional 3 to 4 minutes to ensure that the monomers are completely polymerized.

In the third reactor, a polyfunctional coupling agent is added to the solution of $A{-}B{\rightarrow}A')_{\overline{x}}Li$ and $(B{\rightarrow}A')_{\overline{x}}Li$ segments and allowed to couple the segments into the radial block copolymer of general formula $$(A{-}(B{\rightarrow}A')_{\overline{x}})_{\overline{m}}X{-}(A'{\leftarrow}B)_x)_n$$

where m and n are integers whose sum is between 3 and 20, A is the nonelastomeric polymer segments whose sum is based on 80 to 95 percent by weight of the total monovinyl aromatic compound, $(B{\rightarrow}A')_x$ or $(A'{\leftarrow}B)_x$ is an elastomeric copolymer segment based on a series of x tapered blocks from the diene (B) and the monovinyl aromatic compound (A'), x is the number of separate additions of the diene monomer and X is the radical of the polyfunctional coupling agent.

In the fourth reactor, the polymerization mixture is terminated by the addition of an alcohol, preferably methanol, stabilizers are added, and the polymer recovered by known means. The final recovery may be made by storing the stabilized product from the fourth reactor in a storage tank until sufficient product is accumulated to permit devolatilization extrusion to pellets to be undertaken.

At the appropriate time in the preparation of the rubber block in the second reactor, preparation for another run can begin in the first reactor. While the reaction of the initial run continues in the second vessel, a styrene front block for the second run is underway and will follow through the subsequent polymerization steps of the first run, etc., for additional runs in tandem—forming a semicontinuous process.

The monovinyl aromatic compound useful in the invention is preferably styrene, but may be alkyl substituted styrenes which have similar copolymerization characteristics, such as, alphamethylstyrene and the ring substituted methylstyrenes, ethylstyrenes and t-butylstyrene.

The amount of monovinyl aromatic compound useful in the invention is between 60 and 90 percent by weight based on the total weight of monomers utilized.

The hydrocarbyllithium initiators useful in the invention are the known alkyllithium compounds, such as methyllithium, n-butyllithium, sec-butyllithium; the cycloalkyllithium compounds, such as cyclo-hexyllithium; and the aryllithium compounds, such as phenyllithium, p-tolyllithium and naphthyllithium.

The amounts of hydrocarbyllithium added should be between 0.2 and 10.0 millimoles per mole of monomer in each of the first two reactors of the instant process. The second reactor should use the same or a greater amount of initiator than the first reactor. The total amount of initiator used depends on the molecular weight and number of polymer chains of each type desired.

The conjugated dienes useful in the invention are those having from 4 to 8 carbon atoms in the molecule, such as 1,3-butadiene, isoprene, 2,3-dimethyl-1,3-butadiene, piperylene and mixtures thereof.

The polymerization is conducted in an inert hydrocarbon solvent such as isobutane, pentane, cyclohexane, benzene, toluene, xylene and the like. To polymerization is carried out in the absence of air, moisture, or any other impurity which is known to be detrimental to anionic catalyst systems.

The polyfunctional coupling agents suitable for the invention may be any of the materials known to have functional groups which can react with carbon to lithium bonds to add the carbon chain to the functional group. Typical examples of the suitable coupling agents are the polyepoxides, such as epoxidized linseed oil; the polyesters such as diethyl adipate; the polyhalides, such as silicon tetrahalide; the polyisocyanates, such as benzene-1,2,4-triisocyanate; the polyimines, such as tri (1-aziridinyl) phosphine oxide; the polyaldehydes, such as 1,4,7-naphthalene tricarboxaldehyde; the polyketones, such as 2,4,6-heptanetrione; the polyanhydrides, such as pyromellitic dianhydride; and the polyacid chlorides, such as mellitic acid chloride. Especially useful, and preferred herein, are the polyvinyl aromatic compounds such as divinylbenzene, which although only difunctional as monomers, can polymerize to form polyfunctional agents in situ and serve as coupling agents. Suitable are the ortho-, meta-, or para-divinylbenzenes, or mixtures thereof.

The amount and type of coupling agent used is dependent upon the number of polymer chains having lithium terminated ends and the number of arms desired per star-block molecule. Thus, for agents having a fixed number of functional groups such as silicon tetrachloride, an equivalent of agent per equivalent of lithium terminated polymer chains, gives a four armed star-block copolymer. In the case of difunctional agents which polymerize during the coupling reaction, such as divinylbenzene, the amounts of agent to be used must be determined for the conditions of reaction, since the number of equivalent functional sites is variable. However, the amounts will vary only from 0.5 to 3.5 parts by weight, and preferably 0.8 to 2.0 parts by weight, of divinylbenzene per 100 parts by weight of total monomers.

The polymerization process for preparing the star-block copolymers consists essentially of a. charging a first reactor with the solvent and initiator and heating to 70° to 85° C., followed by the addition in 3 equal portions, over a period of from 6 to 15 minutes, of from 80 to 95 percent by weight of the total monovinyl aromatic compound while maintaining the reactor at polymerization temperature;

b. transferring the contents of the first reactor to a second reactor and charging additional initiator in an amount equal to greater than that added in step a. and the remaining 5 to 20 weight percent of monovinyl compound followed by the conjugated diene in at least 3 equal portions over a period of 27 to 55 minutes while maintaining the second reactor at a temperature of from 65° to 80° C., wherein each portion of the diene is added immediately after the pale yellow color of the dienyl anion changes to the reddish-brown color of the styryl monovinyl aromatic anion, and wherein the styryl monovinyl aromatic anion color reappears after the final portion of diene has completely polymerized;

c. transferring the contents of the second reactor to a third reactor and charging 0.5 to 3.5 parts by weight of coupling agent per 100 parts by weight of total monomers and allowing to couple at 65° to 80° C. for 30 to 60 minutes to form star-block copolymer;

d. transferring the contents of the third reactor to a fourth reactor, terminating the polymerization by the addition of methanol and adding stabilizers to the mixture and recovering the polymer by extrusion into polymer pellets; and e. repeating steps a–d as soon as each reactor is emptied into the succeeding reactor.

Since each reactor is used for only one reaction, the reactors do not need to be cleaned out between runs and the process can be run more economically and in shorter times than the usual batch process.

The following example is given to illustrate the invention, but not to limit the claims. All parts and percentages are by weight unless otherwise specified.

EXAMPLE I

A.

Preparation of a star-block copolymer having 25/75 ratio of butadiene/styrene in the arms by a batch polymerization process.

A one gallon stirred reactor was charged with 1,800 g of purified cyclohexane and heated to 70° C. A trace of diphenylethylene (0.2 g) was added to the cyclohexane by means of a hypodermic needle. A solution of sec-butyllithium in cyclohexane was added to the reactor portionwise until a permanent orange-yellow color was obtained. The solution was then backtitrated with cyclohexane until the color just disappeared. The solvent and reactor were now ready for the polymerization of monomer. Into the closed reactor was charged 9.60 millimoles of sec-butyllithium and 584 g of styrene and the reactor held at 70° C. for 30 minutes. Analysis of the solution by U.V. analysis showed that less than 0.01% by weight of the styrene monomer remained. At this point, an addition 14.40 m moles of sec-butyllithium was added and a continuous feed of 144 g of butadiene was added over 120 minutes using a controlled volume mini-pump. About 3 minutes after the start of the butadiene feed, a charge of 91 g of styrene was added. When the last of the continuous feed was added, an additional 81 g of butadiene was added and the whole mixture held for 28 minutes. There was then added 13.2 ml of divinylbenzene of 55% purity and the whole held for one hour at 70° C. to complete the linking reaction. Total reaction time was 238 minutes. The system was then terminated by the addition of 1 g of methanol. The polymer solution was transferred to a 5 gallon polyethylene liner, diluted further with acetone and the polymer was precipitated by adding isopropanol under high speed stirring. The polymer was then treated with 1.0 part Polygard HR, a commercial antioxidant, and 0.5 part 2,6-ditertbutyl-4-methylphenol per 100 parts by weight of polymer. The wet polymer was dried by a hot air stream in a fluid bed dryer, then extruded and pelletized.

The product was analyzed and found to have about 10 linear arms which had a bimodal distribution in molecular weight prior to coupling. The longer arms had a number average molecular weight of about 84,000 consisting of a polystyrene block of number average molecular weight 67,000, a block of random styrene/butadiene copolymer of number average molecular weight 13,000 and a polybutadiene block of number average molecular weight 4,000. The shorter arms had a number average molecular weight of 17,000 and consisted only of a random styrene/butadiene copolymer segment and a polybutadiene segment identical to those in the longer arms. The ratio of longer arms to shorter arms was 40/60 in the finished star polymer. Number average molecular weights were determined by Gel Permeation chromatograph using polystyrene standards. The random nature of the rubbery styrene/butadiene segments was shown by plotting Tan$\delta$ vs. Temperature (from torsion pendulum measurements) and noting the single glass transition temperature at −45° C. Injection molded tensile bars of the star-block copolymer were very transparent and the physical properties are shown in Table I. The melt index was determined by ASTM D-1238 at 200° C. under 5,000 g load. The Gardner falling weight impact test was performed on a Gardner Variable Impact Tester manufactured by Gardner Laboratory, Inc. of Bethesda, Md. Izod unnotched impact was measured by ASTM D-256 and the Flex modulus by ASTM D-790. The overall composition of the radial block copolymer was 75% by weight styrene and 25% by weight butadiene, with 86.5% of the total styrene being in the polystyrene block segment of the long arms and 13.5% of the total styrene being in the styrene/butadiene random segment. This material was free of orientation during the processing and non-stress whitening or bending.

TABLE I

|  | Ex. IA | Ex. IB |
| --- | --- | --- |
| Polymerization Time (Min.) | 238 | 65 |
| Melt Index (g/10 min) | 3.2 | 3.0 |
| Gardner Falling Weight (in./lb.) |  |  |
| at Room Temperature | 240 | 320+ |
| at −30° C. | 50 | 150 |
| Izod Impact, Unnotched (ft.-lb./in.) | 22.7 | 20.3 |
| Flex Modulus (psi) | 183,000 | 187,000 |
| Tensile Strength |  |  |
| yield, psi | 3,700 | 3,600 |
| break, psi | 2,000 | 1,900 |
| Tensile Elongation |  |  |
| yield, psi | 27 | 32 |
| break, psi | 3.2 | 3.2 |

B.

Preparation of a star-block copolymer having 25/75 ratio of butadiene/styrene in the arms by a semicontinuous polymerization process.

A one gallon stirred reactor was charged with 1,800 g of purified cyclohexane, heated to 83° C. and titrated with sec-butyllithium, as in part A above, to sterilize solvent and reactor. Into the closed reactor was charged 9.60 millimoles of sec-butyllithium and 584 g of styrene in 3 equal batch additions while maintaining the reactor at 83° C. over 8 minutes to ensure complete polymerization of all the styrene to polystyryl chains terminated by active lithium ions.

The reactor contents were transferred to a second one gallon reactor and this second reactor was then charged with an additional 14.4 millimoles of sec-butyllithium followed by 74 g of butadiene and 91 g of styrene in that order. The temperature was maintained at 80° C., while the initial charge was allowed to polymerize for 8 minutes, at which time the reddish-brown color of the styryl anion appeared, and then 74 g more of butadiene was added. Again, after 8 minutes, the reddish-brown color of the styryl anion appeared and the final 74 g. of butadiene was added. The polymerization was allowed to proceed for about 8 minutes, when the styryl anion color reappeared and the mixture was maintained at 80° C. for an additional 4 minutes and then the mixture was transferred to a third one gallon reactor. There was then added 13.2 ml of divinylbenzene of 55% purity and the whole held at 80° C. for 30 minutes to complete the coupling reaction. The mixture was then transferred to a fourth reactor and the polymerization terminated by the addition of alcohol as in Example IA. Total reaction time was 66 minutes. The system was terminated as in IA and the polymer pelletized via a 2-pass devolatilizing extruder and injection molded into test specimens. The test results are shown in Table I as IB. It is obvious from Table I that comparable physical properties were obtained in IB to IA with a reduction in polymerization time from 238 to 66 minutes. It should also be obvious from the times in each reactor, that at the appropriate time in the preparation of the rubber block in the second reactor, preparation for another run can begin in the first reactor and so forth, down the line. Thus, a semi-continuous process is taught.

Although the molecular weight of the various blocks in the star-block copolymer product was not measured, the similarity of physical properties of the product made by the semi-continuous process to those of the product made by the batch process indicates a high probability that the molecular weights of the two products are in the same range.

The basic structural difference of the products is predicted to be that the batch process produces a polymer having bimodal arm structure and a formula

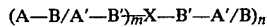

whereas the semi-continuous process gives a bimodal arm structure and a formula

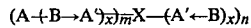

wherein the A represents a non-elastomeric polymer segment based on the monovinyl aromatic compound, the (B→A') or (A'←B) represents an elastomeric polymer segment based on a series of tapered copolymers of the monovinyl aromatic compound and the conjugated diene (A' is the weight percent of monovinyl compound and B is the weight percent of conjugated diene in the elastomeric polymer segment), m and n are integers whose sum is from 3 to 20, x is an integer from 3 to 10 representing the number of additions of conjugated dienes used in the semi-continuous process, and X is the radical of a polyfunctional coupling agent by means of which the linear polymer blocks are chemically linked to form the star-block copolymers.

I claim:

1. A semi-continuous process for preparing star-block copolymers of a monovinyl aromatic compound and a conjugated diene in an inert hydrocarbon solvent using an anionic initiator consisting of:
   a. charging a first reactor with the solvent and initiator and heating to 70° to 85° C. followed by the addition in 3 equal portions, over a period of from 6 to 15 minutes, of from 80 to 95 percent of the total amount of monovinyl aromatic compound while maintaining the reactor at polymerization temperature;
   b. transferring the contents of the first reactor to a second reactor and charging additional initiator in an amount equal to or greater than that added in step a, and any remaining monovinyl aromatic compound and then adding all of the conjugated diene in at least 3 equal portions over a period of 27 to 55 minutes while maintaining said second reactor at a temperature of from 65° to 80° C., wherein each portion of the diene is added immediately after the pale yellow color of the dienyl anion changes to the reddish-brown color of the monovinyl aromatic anion, and wherein the monovinyl aromatic anion color reappears after the final portion of diene has completely polymerized;
   c. transferring the contents of said second reactor to a third reactor and charging 0.5 to 3.5 parts by weight of coupling agent per 100 parts by weight of total monomer and allowing to couple at 70° to 80° C. for 30 to 60 minutes to form star-block copolymer;
   d. transferring the contents of said third reactor to a fourth reactor, terminating the polymerization by the addition of methanol, adding stabilizers, and recovering the polymer by extrusion into polymer pellets; and
   e. repeating steps a–d as soon as each reactor is emptied into the succeeding reactor.

2. The process of claim 1 wherein the weight ratio of monovinyl aromatic compound to conjugated diene is from 60/40 to 90/10.

3. A thermoplastic star-block copolymer having a general formula

wherein the A represents a non-elastomeric polymer segment based on the monovinyl aromatic compound, the (B→A')$_x$ or (A'←B)$_x$ represents an elastomeric polymer segment which is a series of x tapered blocks of conjugated diene (B) to monovinyl aromatic compound (A') copolymers, m and n are integers whose sum is from 3 to 20, x is an integer from 3 to 10 representing the number of additions of conjugated diene used in the semi-continuous process and X is the radical of a polyfunctional coupling agent by means of which the linear polymer blocks are chemically linked to form the star-block copolymers.

4. The star-block copolymer of claim 3 wherein said polyfunctional coupling agent is selected from o-divinylbenzene, m-divinylbenzene, p-divinylbenzene and mixtures thereof.

5. The star-block copolymer of claim 3 wherein said polyfunctional coupling agent is selected from polyepoxides, polyesters, polyhalides, polyisocyanates, polyimines, polyaldehydes, polyketones, polyanhydrides and polyacid chlorides.

6. The star-block copolymer of claim 3 wherein the monovinyl aromatic compound is styrene, the conjugated diene is butadiene and the polyfunctional coupling agent is divinylbenzene.

* * * * *